US008800399B2

United States Patent
Mills

(10) Patent No.: US 8,800,399 B2
(45) Date of Patent: Aug. 12, 2014

(54) HYDRAULIC CIRCUIT FOR AUTOMATIC TRANSMISSION HAVING AREA CONTROLLED SHIFT ACTUATOR VALVE WITH FLOW FORCE COMPENSATION

(75) Inventor: David C. Mills, Lake Orion, MI (US)

(73) Assignee: Borgwarner Inc., Auburn Hills, MI (US)

( * ) Notice: Subject to any disclaimer, the term of this patent is extended or adjusted under 35 U.S.C. 154(b) by 362 days.

(21) Appl. No.: 13/393,660

(22) PCT Filed: Sep. 2, 2010

(86) PCT No.: PCT/US2010/047604
§ 371 (c)(1),
(2), (4) Date: Mar. 1, 2012

(87) PCT Pub. No.: WO2011/031611
PCT Pub. Date: Mar. 17, 2011

(65) Prior Publication Data
US 2012/0168274 A1    Jul. 5, 2012

Related U.S. Application Data

(60) Provisional application No. 61/241,062, filed on Sep. 10, 2009.

(51) Int. Cl.
| F16K 11/07 | (2006.01) |
| F16K 39/04 | (2006.01) |
| F16K 31/06 | (2006.01) |
| F16H 61/28 | (2006.01) |
| F16H 61/02 | (2006.01) |
| F16H 61/688 | (2006.01) |

(52) U.S. Cl.
CPC ..... *F16K 11/0708* (2013.01); *F16H 2061/0253* (2013.01); *F16H 61/0251* (2013.01); *F16H 61/688* (2013.01); *F16K 31/0613* (2013.01); *F16H 61/2807* (2013.01);

USPC .......... 74/335; 137/118.02; 137/625.69; 251/282

(58) Field of Classification Search
USPC ............... 74/335; 137/118.02, 625.69
See application file for complete search history.

(56) References Cited

U.S. PATENT DOCUMENTS 2,702,049 A     2/1955  Seeloff
2,747,612 A *   5/1956  Lee .............................. 251/324
(Continued)

FOREIGN PATENT DOCUMENTS

DE    27 11 861 A1    9/1978
DE    196 31 983 C1   2/1998
(Continued)

OTHER PUBLICATIONS

May 25, 2011 International Search Report (PCT/US2010/047604).

*Primary Examiner* — Ha D Ho
(74) *Attorney, Agent, or Firm* — Howard & Howard Attorneys PLLC

(57) ABSTRACT

A hydraulic circuit (88) for an automatic transmission (10) that employs a shift actuation valve (96) that controls the actuation of the synchronizer (29) for selectively controlling gear engagement. The shift actuation valve (96) includes a valve member (114) having at least one valve element (122) with an outer diameter (162) and a metering face (164). The metering face (164) is adapted to control the flow of pressurized fluid between an inlet (108) and an outlet (110) of the valve body (102). The metering face (164) includes a flow force compensating annular void (166) disposed adjacent the outer diameter (162) and that is defined by a lead angle α measured between the outer diameter (162) and a line intersecting the outer diameter (162) and tangential to the annular void (166). A solenoid (104) is employed to move the valve member (114) between predetermined positions.

8 Claims, 4 Drawing Sheets

(56) References Cited

U.S. PATENT DOCUMENTS

| | | | |
|---|---|---|---|
| 3,053,051 A | 9/1962 | Kelley | |
| 3,525,500 A * | 8/1970 | Bender | 251/324 |
| 4,023,444 A | 5/1977 | Murakami | |
| 4,155,535 A | 5/1979 | Seamone | |
| 4,220,178 A | 9/1980 | Jackson | |
| 4,646,786 A * | 3/1987 | Herder et al. | 137/625.69 |
| 4,662,249 A | 5/1987 | Miki et al. | |
| 4,941,508 A | 7/1990 | Hennessy et al. | |
| 5,186,213 A * | 2/1993 | Urata et al. | 137/625.61 |
| 5,617,895 A * | 4/1997 | Pfuhl et al. | 137/625.69 |
| 5,697,401 A * | 12/1997 | Shinoda et al. | 137/625.62 |
| 5,732,736 A | 3/1998 | Ollivier | |
| 5,944,042 A | 8/1999 | Takahashi et al. | |
| 6,378,302 B1 | 4/2002 | Nozawa et al. | |
| 6,435,213 B2 | 8/2002 | Lou | |
| 6,438,952 B1 | 8/2002 | Nozawa et al. | |
| 6,957,665 B2 | 10/2005 | Shin et al. | |
| 7,431,043 B2 | 10/2008 | Xiang et al. | |
| 2002/0082131 A1 | 6/2002 | Park et al. | |
| 2004/0138025 A1 | 7/2004 | Yamaguchi et al. | |
| 2009/0071545 A1 | 3/2009 | Xiang et al. | |

FOREIGN PATENT DOCUMENTS

| | | |
|---|---|---|
| EP | 1 197 695 A2 | 4/2002 |
| JP | 57-179459 | 11/1982 |
| JP | 04-011708 U | 1/1992 |

* cited by examiner

HYDRAULIC CIRCUIT FOR AUTOMATIC TRANSMISSION HAVING AREA CONTROLLED SHIFT ACTUATOR VALVE WITH FLOW FORCE COMPENSATION

BACKGROUND OF THE INVENTION

1. Field of the Invention

The present invention relates, generally, to a hydraulic circuit for an automatic transmission, and more specifically, to such a hydraulic circuit having area controlled shift actuator valves with flow force compensation.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Automatic transmissions typically include a plurality of gear sets that are supported on shafts in the transmission housing. Synchronizers are used to coordinate the engagement of selected gears in the transmission. Torque is translated from the engine through the transmission at various gear ratios depending on the gear that is selected. Most automatic transmissions are controlled and actuated hydraulically. However, it has been found that controlling and regulating automatic transmissions to achieve the desired vehicle occupant comfort goals in an efficient and cost effective manner is a complicated matter. There are a large number of events to properly time and execute within the transmission for each shift to occur smoothly and efficiently.

Furthermore, since the control of automatic transmissions is carried out by hydraulically actuating the various components within the transmission, it is important to provide a stable hydraulic pressure. A pump is employed to provide pressurized hydraulic fluid for the control and actuation of the transmission. In addition, the clutches and gear assemblies are lubricated and cooled by a secondary flow of hydraulic fluid. Typically, the pump is mechanically driven by a power take-off from the engine. Thus, the hydraulic pressure delivered from the pump increases as the pump speed increases in response to an increase in engine speed. Since hydraulically actuated devices respond in a predetermined and a precise manner for the given pressure supplied to actuate them, inaccurate control of the hydraulic pressure causes inaccurate operation and control of the transmission. Up to this point, establishing and maintaining a stable hydraulic pressure in an automatic transmission has proven problematic.

The hydraulic supply circuits of conventional transmissions typically include a plurality of hydraulic valves. However, the design and operation of these valves generally fail to properly account for various flow effects of the hydraulic fluid within the hydraulic circuit and do not provide the precise and stable hydraulic pressure that is necessary to ensure accurate control over the transmission. More specifically, to provide a stable system pressure, the hydraulic valves must be responsive to changes in the flow forces that occur within the circuit due to changes in the hydraulic flow in the line pressure side and the return, or suction side of the valve.

Changes in the flow force of the hydraulic fluid can particularly affect the operation of the shift actuator valves that control actuation of the synchronizers and thus corresponding shifts among adjacent gears. The flow force is the relative force of the hydraulic fluid that acts upon the lands of the valve member as the fluid moves through the valve. The effects of these flow forces upon the shift actuator valves are manifest as the fluid flow moves through the valve body. As the hydraulic fluid moves through the valves, the inherent flow forces act against the physical surfaces of the valve member, and the applied force can physically effect the position of the valve member in the valve body causing it to move and generate instability in the valves. For example, an increase in fluid flow from the pump may act upon the valve member surfaces forcing them open further, or an increase in pump suction may cause the valve member to move in an uncontrolled manner. The movement of the valve member caused by the flow forces results in instability in the line pressure and causes further variations in the flow as the valve member tries to correct.

The conventional approaches employed with hydraulic shift actuator valves in automatic transmissions remain inefficient and susceptible to fluctuations and inaccurate control of the hydraulic pressure causing inaccurate control of the synchronizers and this can affect the smoothness of shifts in any gear in the transmission. Accordingly, there remains a need in the related art for an automatic transmission having a shift actuator valve with flow force compensation that provides stable hydraulic pressure for both steady state flow and transient flow conditions. In addition, there remains a need in the related art for an improved hydraulic circuit having a shift actuator valve wherein the area of the orifices in the shift actuator valve are opened in a controlled fashion to provide hydraulic pressure to the synchronizer to thereby better control the shift between gears while maintaining low system cost.

SUMMARY OF THE INVENTION

The disadvantages of the related art are overcome by the present invention in a hydraulic circuit for an automatic transmission having a plurality of gear sets and synchronizers for coordinating shifts between the gear sets. The hydraulic circuit includes a source of pressurized fluid and a shift actuation valve including a valve body having a valve bore and at least one inlet in fluid communication with the source of pressurized fluid and at least one outlet in fluid communication with at least one synchronizer for selectively controlling gear engagements. A valve member is movably supported in the valve bore and includes at least one valve element having an outer diameter and a metering face. The metering face is adapted to control the flow of pressurized fluid between the inlet and the outlet of the valve body. The metering face includes a flow force compensating annular void disposed adjacent the outer diameter and defined by a lead angle α measured between the outer diameter and a line intersecting the outer diameter and tangential to the annular void. In addition, the shift actuation valve includes a solenoid that is adapted to move the valve member to produce a flow area through the shift actuation valve that is a function of the current delivered to the solenoid to deliver a predetermined amount of pressurized fluid to at least one synchronizer to selectively control the actuation of the synchronizer to select a predetermined one of the plurality of gear sets in the transmission.

In this manner, the hydraulic circuit of the present invention having at least one shift actuator valve with flow force compensation provides the advantages of highly stable and accurate control of the synchronizer and related gear shifter regardless of steady state flow and transient flow conditions. The shift actuator valve includes a shaped valve member and ports that direct the hydraulic flow through the shift actuator valve in such a manner as to reduce the effects of the flow forces inherent in the flow of the hydraulic fluid moving through the valve. This provides extremely accurate and stable hydraulic system pressure resulting in accurate and efficient control of the synchronizers used to shift between gear sets in the transmission, which translates into improved the efficiency of the transmission and the vehicle.

Other objects, features and advantages of the present invention will be readily appreciated, as the same becomes better understood after reading the subsequent description taken in connection with the accompanying drawings.

DETAILED DESCRIPTION

The present invention relates, generally, to a hydraulic circuit for an automatic transmission, and more specifically, to such a hydraulic circuit having area controlled solenoid valves with flow force compensation. Generally speaking, an automatic transmission forms a portion of a vehicle powertrain and is responsible for taking a torque input from a prime mover, such as an internal combustion engine, and transmitting the torque through selectable gear ratios to the vehicle drive wheels. The present invention overcomes the shortcomings and drawbacks related to transmissions having hydraulic systems that do not account for the flow forces that inherently act upon the valve member used in the hydraulic system.

Figure 1:
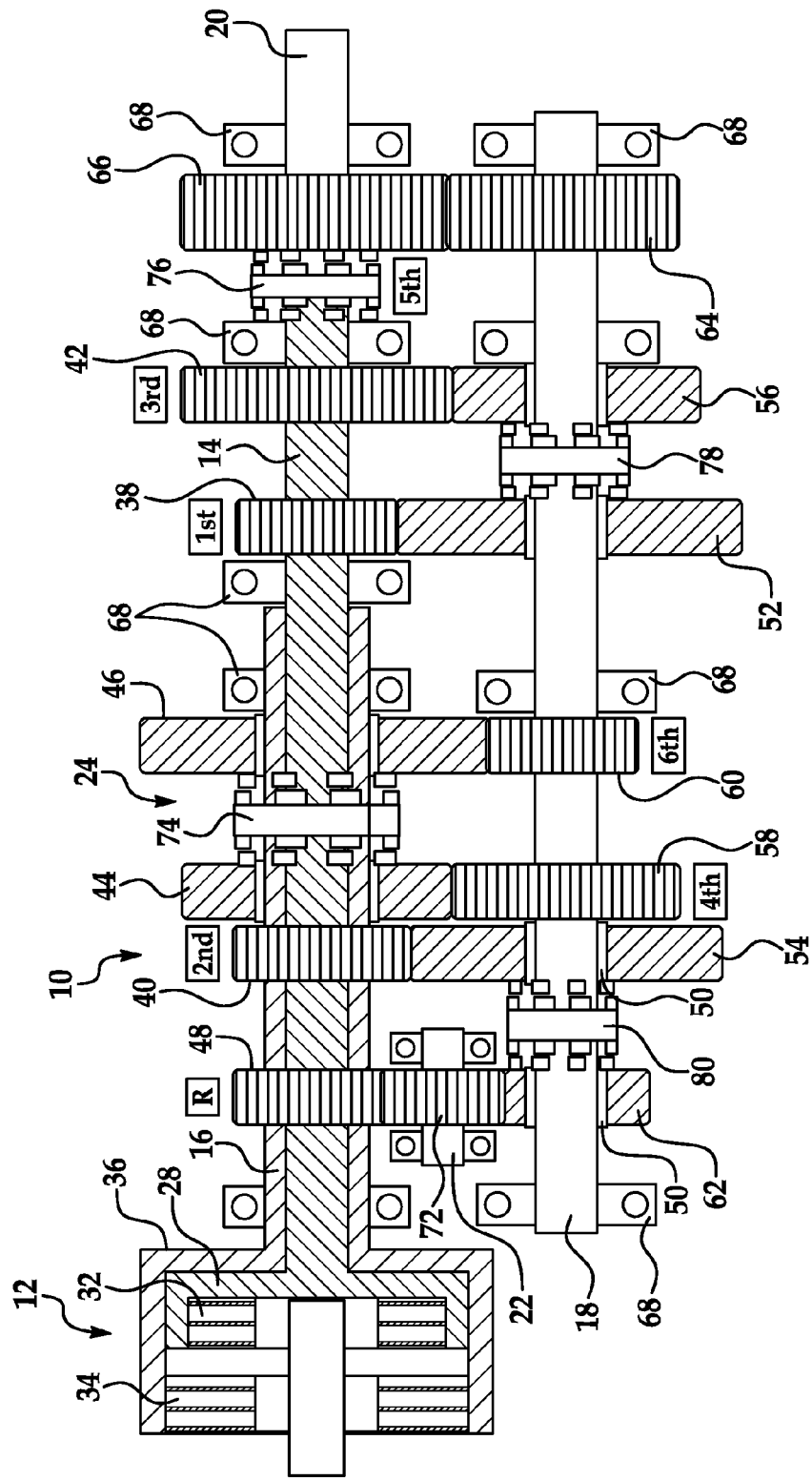
FIG. 1 is a schematic illustration of a dual clutch transmission of the type that may employ the hydraulic valves of the present invention.

One example of an automatic transmission of the present invention having a hydraulic system employing valves that accounts for flow forces in the system is represented as a dual clutch transmission, and is generally indicated at 10 in the schematic illustration of FIG. 1. However, those having ordinary skill in the art will appreciate from the description that follows that the hydraulic circuit of the present invention may be employed in all types of automatic transmissions that utilize hydraulic valves to control hydraulic pressure within the system. With regard to the representative example, as shown in FIG. 1, where like numbers indicate like structure throughout the drawings, the transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

The dual, coaxial clutch assembly 12 illustrated in FIG. 1 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. In one embodiment shown in FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In one embodiment, the counter shaft 18 includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1. Moreover, those having ordinary skill in the art will appreciate that the transmission illustrated in FIG. 1 is only representative of one embodiment of a transmission. From the description that follows, those having ordinary skill in the art will appreciate that the present invention may be employed in the hydraulic circuit used to control transmissions having any number of conventional configurations.

The engagement and disengagement of the various forward and reverse gears is accomplished by the actuation of the synchronizers 24 within the transmission. As shown in FIG. 1 in this example of a transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center or neutral position to the right and engage another gear to its shaft when moved to the left of the neutral position. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. Those having ordinary skill in the art will appreciate that the term "synchronizer" as used herein includes not only the device that is used to engage a respective gear, but also any associated hydraulic actuators used to move the physical device that engages the gear.

It also should be appreciated that the operation of the transmission 10 is managed by some type of control device such as an electronic control unit (ECU) that oversees the functioning of the transmission 10, or by an electronic control unit for the vehicle in which the transmission 10 may be installed. Regardless, there exists a control device, beyond the scope of this invention, that controls and operates the transmission through a stored control scheme or series of control schemes of which the present invention is merely a part. The control device having the capability of providing the proper voltages, signals, and/or hydraulic pressures to operate the transmission 10.

Thus, it can be readily seen that a number of hydraulic control assemblies or systems must be in place to control the operation of the transmission. Furthermore, since the clutch mechanisms, gear sets, and other mechanical portions of the transmission are cooled and lubricated by the hydraulic fluid that is circulated within the transmission, there must be a control assembly or system for these purposes as well. Thus, it should be appreciated that the transmission 10 includes an electro-hydraulic circuit and the additional associated structure to hydraulically control the transmission. For example, with reference to the schematic drawing of a representative hydraulic circuit, generally indicated at 88 in FIG. 2, the transmission 10 typically includes a pump, generally indicated at 82, that draws from a fluid sump and produces a flow of pressurized hydraulic fluid. The pressurized hydraulic fluid is used as the hydraulic actuation and motive force for the transmission control assemblies and systems, and is also used as the lubrication and cooling media within the transmission. It should be further appreciated that the pump 82 provides an output of pressurized hydraulic fluid through a filter 84 and cooling device 86 such as a heat exchanger. In this manner, the pump 82 provides filtered and cooled hydraulic fluid as "line" pressure for actuating the various devices within the transmission and provide a source of cooling media. In addition, the hydraulic circuit may also include a number of valves to control the flow of hydraulic fluid in the hydraulic circuit 88. These hydraulic valves may include, but are not limited to, a cooler relief valve 90, a lube regulator 92, an actuator regulator valve 94, a shift actuation valve 96, a variable forced solenoid valve 98, and a pressure regulator 100.

The cooler relief valve 90 acts to limit the secondary pressure to a point below line pressure as a means of protecting the cooling device 86. The lube regulator 92 controls the pressure to the clutch lube/cooling circuit. The actuator regulator valve 94 acts to regulate the pressure that can be directed to a shift actuation valve that controls the shifting between the gears of the transmission. In the embodiment illustrated in FIG. 2, the hydraulic circuit may include a pair of shift actuation valves 96. The shift actuation valves 96 include a direct acting, area controlled solenoid that acts to position a hydraulic valve to control flow. In this case, the shift actuation valves 96 may be employed to control the flow to and from the shift actuator pistons 97 that engage and disengage the synchronizers 24 as described above. In the embodiment illustrated in FIG. 2, the hydraulic circuit may include a pair of variable force solenoid valves 98. The variable force solenoid valves 98 are a type of regulator valve that employs a feedback force to oppose the action of the solenoid. The variable force solenoid valves 98 may be employed to provide direct pressure control to the clutches of the dual clutch transmission. Thus, flow through the variable force solenoid valve 98 may be high during periods of clutch fill and stroke when the clutch piston is moving.

Figure 2:
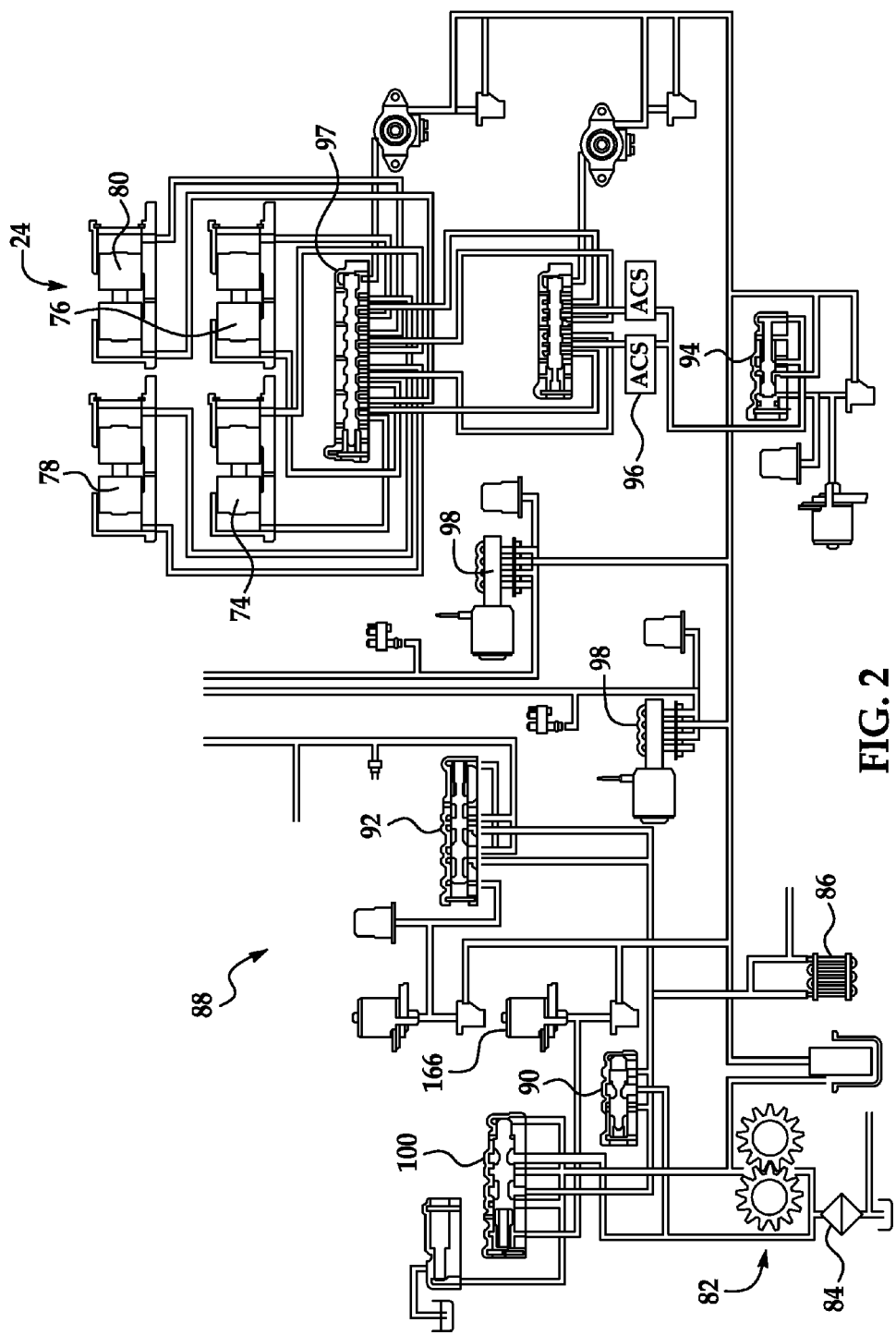
FIG. 2 is a schematic diagram of a representative hydraulic circuit for an automotive transmission illustrating various hydraulic valves of the present invention.

With respect to the hydraulic circuit 88 illustrated in FIG. 2, those having ordinary skill in the art will appreciate that the circuit may include a number of other components employed to control and actuate various components of the transmission. These components and their functions are generally well known in the related art and so a detailed discussion of these components is not necessary in order to obtain an understanding of the present invention. Accordingly, the remainder of the detailed description will focus on the structure of a shift actuation valves 96 employing the features of the present invention.

As noted above, the shift actuation valve controls the actuation of the synchronizers and thus shifts among adjacent gears in the transmission. The shift actuation valve is also generally indicated at 96 in FIG. 3. The shift actuation valve 96 includes a valve body, generally indicated at 102, and a solenoid assembly, generally indicated at 104. As noted above, both of these components will be described in greater detail below with reference to FIGS. 3-6.

More specifically, the valve body 102 includes a valve bore 106 and at least one inlet 108 in fluid communication with a source of pressurized fluid. In addition, the valve body 102 also includes at least one outlet 110 in fluid communication with at least one synchronizer 24 for selectively controlling shifts between gear sets. In the embodiment illustrated herein, the inlet includes a pressure supply port 108. The outlet includes a pressure control port 110. In the representative example illustrated here, the valve body 102 includes a pair of pressure control ports 110 that establish fluid communication between the valve bore 106 and at least one synchronizer 24 to be controlled by the shift actuator valve 96. The valve body 102 may also include at least one exhaust port 112 for exhausting pressurized fluid from the synchronizer 24 through the other pressure control port 110 when the shift actuator valve is in its "off" position. To this end, the shift actuator valve 96 also includes a valve member, generally indicated at 114, movably supported in the valve body 102 between predetermined positions as will be described in greater detail below. The valve member 114 has a plurality of valve elements, generally indicated at 116.

More specifically, in the representative embodiment illustrated in these figures, the valve member 114 includes three valve elements 118, 120 and 122 operatively separated by first and second areas of reduced diameter, 124 and 126, respectively. The valve elements or lands 116 are disposed in sealing engagement with the valve bore 106 and employed to direct the flow of hydraulic fluid through the valve body 102. The reduced diameter portion 124 may extend between lands 118 and 120 while the reduced diameter portion 126 may extend between lands 120 and 122.

Figure 3:
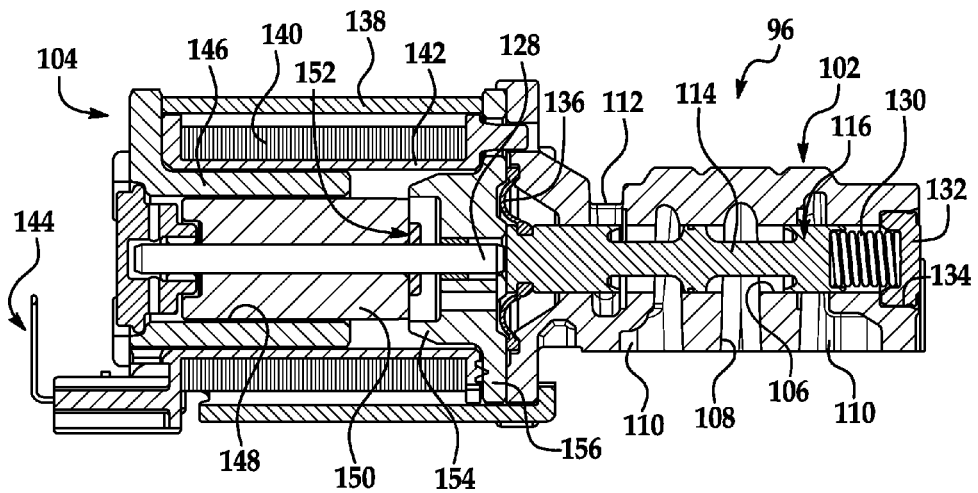
FIG. 3 is a cross-section of the shift actuator valve of the present invention illustrating the valve in first position.

A push rod 128 that is mechanically influenced by the solenoid assembly 104 to move the valve member 114 in one direction (to the right as viewed in FIG. 3). A biasing member 130 is employed to bias the valve member 114 in a direction opposite the movement induced by the solenoid assembly 104, as will be described in greater detail below. In the representative embodiment illustrated herein, the biasing member is a coiled return spring 130 disposed between the land 122 of the valve member 114 and a plug 132 that closes the otherwise open end 134 of the valve bore 106.

The solenoid assembly 104 is adapted to move the valve member 114 to produce a flow area through the shift actuation valve 96 that is a function of the current delivered to the solenoid assembly 104 to deliver a predetermined amount of pressurized fluid to at least one of the synchronizers 24. In this way, the solenoid assembly 104 acts to selectively control the actuation of the synchronizer 24 to select a predetermined one of the plurality of gear sets in the transmission. To this end, the valve body 102 is operatively mounted to the solenoid assembly 104 in a manner that seals the solenoid assembly 104 from contact with hydraulic fluid flowing through the valve body 12. Thus, one end of the valve member 114 is received through an opening in a diaphragm 136 that is fixedly clamped between the valve body 102 and the solenoid assembly 104.

As best shown in FIG. 3, the solenoid assembly 114 includes a housing or "can" 138 and a solenoid coil 140 supported in the housing 138 about a bobbin 142. The solenoid coil 140 consists of wire wrapped around the bobbin 142 and that generates an electromagnetic flux when subjected to a current flowing through the coil 140 as is commonly known in the art. To this end, the solenoid assembly 104 is in communication with a source of electrical power via the connector assembly, generally indicated at 144.

A flux tube 146 is fixedly mounted in the housing 138 and defines an inner space 148. An armature 150 is movably supported in the space 148 defined by the flux tube 146 under the influence of the electromagnetic flux as will be described in greater detail below. The solenoid assembly 104 also includes a pole piece, generally indicated at 152, that is fixedly supported in the housing 138 and disposed opposite the armature 150. As best shown in FIG. 3, the pole piece 152 has a shunt portion 154 that faces the armature 150 as shown in FIG. 3. The pole piece 152 includes an annular base 156. The armature 150 is movable toward the pole piece 152 under the influence of the electromagnetic flux generated by a pulse of current flowing through the solenoid coil 140. In turn, the armature 150 acts on the valve member 114 through the pushrod 128 to move the valve member 114 between predetermined positions.

Pressurized hydraulic fluid flows through the pressure supply port 108, past lands 120 or 122, through the valve bore 106 and out the pressure control ports 110 or from exhaust port 112 through the other pressure control port 110 as dictated by the position of the valve member 114 in the valve bore 106 that is moved in response to the action of the solenoid assembly 104 and the return biasing member 130. In this way, the shift actuator valve 96 is controlled to direct hydraulic fluid from the pressure supply port 108 through the valve bore 106 and to the pressure control ports 110 or from exhaust port 112 through the control port 110 as will be described in greater detail below.

Figure 4:
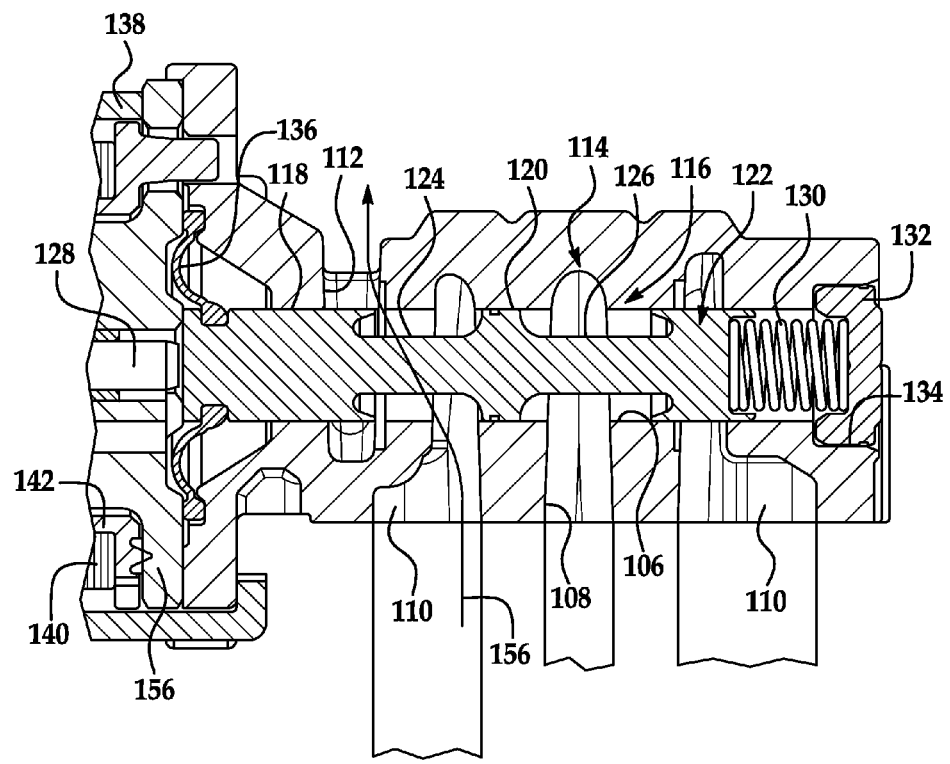
FIG. 4 is an enlarged cross-section of the valve member of the shift actuator valve shown in FIG. 2.

In FIGS. 3-4, the shift actuation valve 96 is shown in a first position. It should be appreciated that the shift actuation valve 96 may be in this position when the engine and pump are off and not providing pressure or when the engine is at idle or the transmission is in neutral. As shown, the exhaust port 112 is in fluid communication with the pressure control port 110 located immediately below it as viewed in these figures so that hydraulic pressure may be exhausted from the synchronizers 24 to the sump as indicated by flow arrow 156 (FIG. 4). In this operative position, the associated synchronizer would be in an unengaged or neutral position.

Figure 5:
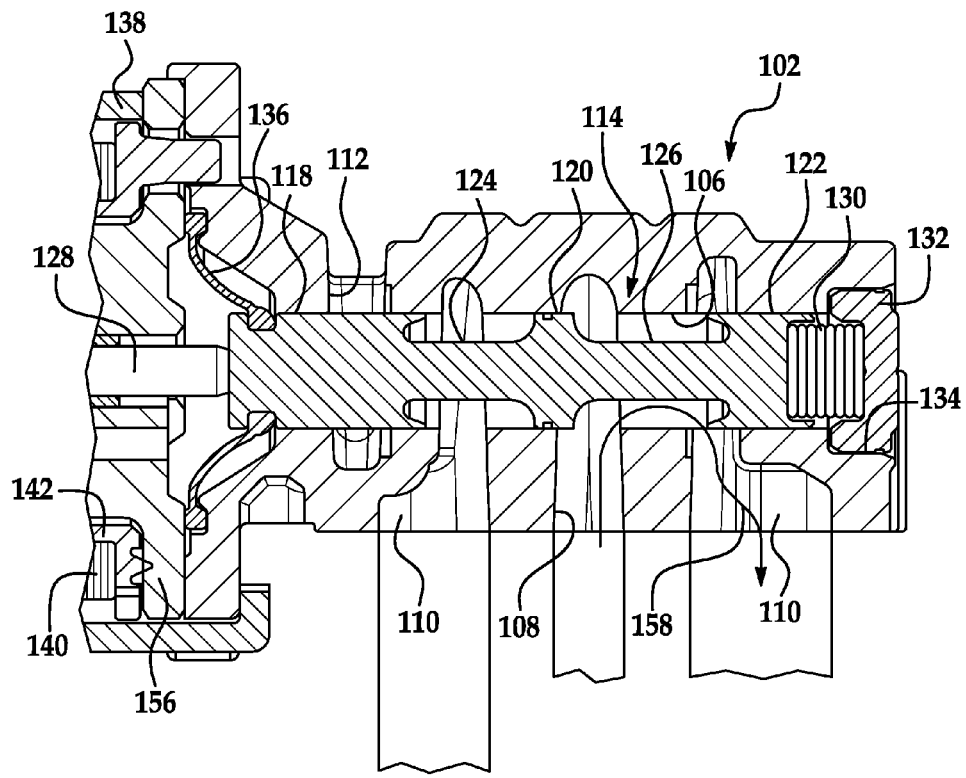
FIG. 5 is an enlarged cross-section of the shift actuator valve shown in FIG. 2 illustrating the valve member in a second position.

As further illustrated in FIG. 5, the valve member 114 of shift actuator valve 96 is shown in a second position. It should be appreciated that the valve member 114 operates in this range when the solenoid assembly 104 is actuated to command an engagement of the gear via actuation of a synchronizer 24. In this operative mode, hydraulic flow is directed through the pressure supply port 108 to the pressure control port 110 and then to the relevant synchronizer, as indicated by the flow path 158.

It should be further appreciated that flow path 158 is a meter-out flow path where the inlet port 108 is open and the second valve element 120 meters (regulates) the flow to the outlet 110. With a meter-out configuration, the valve member 120 is designed to move across and meter the hydraulic flow to the outlet port 110 with the inlet port 108 of the valve open and unrestricted. A meter-out configuration provides good control during transient flow force conditions, but offers less stable control of the steady state flow force. A meter-out configuration of the flow path 158 of the present invention provides compensation for the flow forces so that the valve member 114 is unaffected and the shift actuator valve 96 can provide stable and accurate line pressure to the synchronizers 24.

Due to the increased pressure and the opening of the pressure control or outlet 110, the flow of hydraulic fluid through the shift actuator valve 96 also increases such that steady state flow forces are now strong enough to influence and have a negative affect upon the operation of the shift actuator valve 96. However, the shift actuator valve 96 of the present invention includes flow force compensation with a meter-out configuration. Thus, the dual clutch transmission of the present invention includes a shift actuator valve 96 having a meter-out configuration that provides stability in response to transient flow forces and further includes flow force compensation that provides stable and accurate pressure regulation by overcoming the effects of the steady state flow forces, as well.

Figure 6:
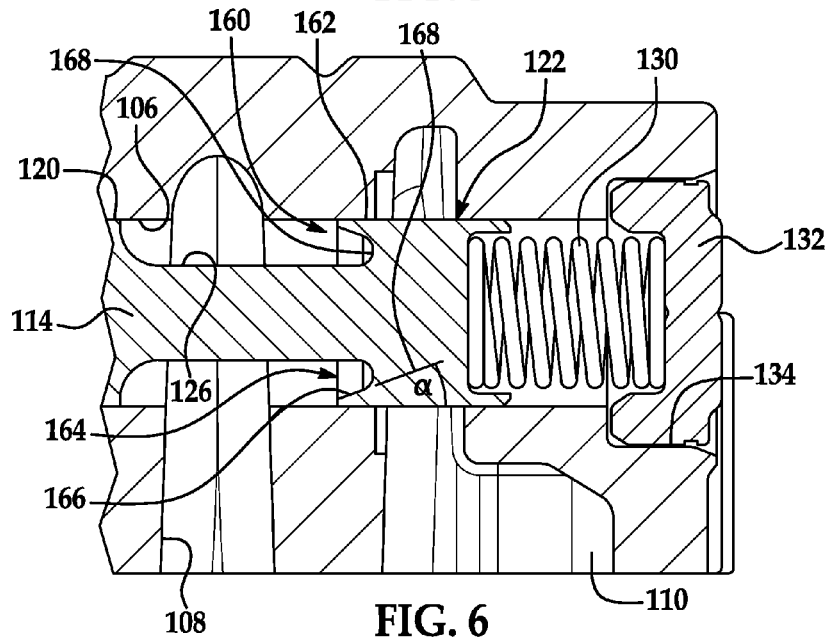
FIG. 6 is an enlarged partial cross-section view of the shift actuator valve shown in FIG. 2 illustrating the valve member having a flow force compensating shape.

As best shown in detail in FIG. 6, to achieve flow force compensation, the valve member 114 further includes a flow force compensating shape, generally indicated at 160. More specifically, valve element 122 has an outer diameter 162 and a metering face 164. The metering face 164 is adapted to control the flow of the pressurized hydraulic fluid between the line inlet port 108 and the control or outlet port 110. The metering face 164 includes a flow force compensating annular void 166 disposed adjacent the outer diameter 162 of the valve element 122 and defined by a lead angle "α" measured between the outer diameter 162 and a line 168 intersecting the outer diameter 162 and tangential to the annular void 166. The annular void 166 terminates at the outer diameter 162 of the valve element 122. The outer diameter 162 of the valve member also defines an annular flat portion that is disposed spaced from the reduced diameter portion 126 of the valve member 114 disposed adjacent to the annular void 166. At valve element 122, the area of reduced diameter 126 is blended into the inner diameter 168 of the annular void 166. The flow force compensating shape 160 of the valve element 122 is adapted to provide compensation for the flow forces of the pressurized hydraulic fluid as the pressurized hydraulic fluid passes though the valve body 102 allowing the pressure regulator to provide a stable and accurate flow regulation of the pressurized hydraulic fluid. In addition, and in the embodiment illustrated in the figures, the valve element 118 may also include a flow force compensating shape to deal with the flow of hydraulic pressure from the control port 110 through the exhaust valve 112. In this case, the valve element 118 would include the same structure as the valve element 122 described above. Likewise, those having ordinary skill in the art will appreciate that the valve member 114 may have any number of valve elements and that any one of these valve elements may employ the flow force compensating shape as described herein to regulate flow of pressurized hydraulic fluid through the valve.

It has also been found that providing any lead angle α less than 90 degrees provides some decrease in the flow force effects on the valve member 114. However, the flow forces acting upon the valve member 114 decay monotonically with respect to the decrease in lead angle α. Therefore, the smaller the lead angle α and the thereby the deeper the annular void 166 in the metering face 164, the greater the reduction in flow force. It should be appreciated that the percentage of reduction in flow force effect will vary somewhat based on the amount of flow at the time the valve member 115 is actuated. In other words, higher flow will cause the relative reduction percentage to be lower for a particular lead angle α and lower flow will cause the relative reduction percentage to by higher for the same respective lead angle α. It should be further appreciated that manufacturing limitations and costs may impact the lead angle chosen in the production of the hydraulic valves described herein. Specifically, while the flow forces may be completely compensated for, in theory, by providing a lead angle α as close to possible to 0 degrees, the monotonically decaying improvement in compensation provides diminishing improvements at the smaller lead angles and may prove more costly or impractical to manufacture. Thus, at present, the embodiment illustrated herein includes a lead angle α of between 15 and 25 degrees, which compensates for the flow forces acting upon the valve member 114 by providing approximately 78% reduction in flow force effect and is economically mass-producible. It should be appreciated that the lead angle α may be continually reduced as manufacturing techniques and processes improve and make smaller lead angles more economically feasible.

Thus, the shift actuator valves employed in the hydraulic circuit illustrated herein include flow force compensation that provides high valve stability and accurate and stable flow regulation with regard to the flow force effects upon the vale member 114 during both steady state and transient regulating conditions The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

I claim:
1. A hydraulic circuit (88) for an automatic transmission having a plurality of gear sets and synchronizers for coordinating shifts between the gear sets, said hydraulic circuit (88) comprising:

a source of pressurized fluid (82);
a shift actuation valve (96) including a valve body (102) having a valve bore (106) and at least one inlet (108) in fluid communication with said source of pressurized fluid (82) and at least one outlet (110) in fluid communication with at least one synchronizer (24) for selectively controlling gear engagement, a valve member (114) moveably supported in said valve bore (106), a solenoid (104);
said valve member (114) including at least one valve element (122) having an outer diameter (162) and a metering face (164), said metering face (164) adapted to control the flow of pressurized fluid between said inlet (108) and said outlet (110) of said valve body (102), said metering face (164) including a flow force compensating annular void (166) disposed adjacent said outer diameter (162) and defined by a lead angle α measured between said outer diameter (162) and a line (168) intersecting said outer diameter (162) and tangential to said annular void (166);
said solenoid (104) adapted to move said valve member (114) to produce a flow area through said shift actuation valve (96) that is a function of the current delivered to said solenoid (104) to deliver a predetermined amount of pressurized fluid to at least one synchronizer (24) to selectively control the actuation of the synchronizer (24) to select a predetermined one of the plurality of gear sets in the transmission.

2. The hydraulic circuit (88) as set forth in claim 1 wherein said lead angle α falls within an angular range between 15 and 25 degrees.

3. The hydraulic circuit (88) as set forth in claim 1 wherein said solenoid (104) is operable to move said valve member (114) in one direction in said valve bore (106), said shift actuation valve (96) further including a biasing member (130) operable to generate a force on said valve member (114) acting in a direction opposite to the direction moved by said solenoid (104).

4. The hydraulic circuit (88) as set forth in claim 1 wherein said valve member (114) defines a reduced diameter portion (126) and said annular void (166) terminates in an annular flat disposed space from said reduced diameter portion (126).

5. An automatic transmission (10) that is adapted to translate torque from a prime mover to an output shaft, said automatic transmission (10) comprising:
- a plurality of gear sets and a plurality of synchronizers (24) that are adapted to coordinate the engagement of selected gear sets;
- a hydraulic circuit (88) including a source of pressurized fluid (82);
- a shift actuation valve (96) including a valve body (102) having a valve bore (104) and at least one inlet (108) in fluid communication with said source of pressurized fluid (82) and at least one outlet (110) in fluid communication with at least one synchronizer (24) for selectively controlling gear engagement, a valve member (114) moveably supported in said valve bore (104), a solenoid (104);
- said valve member (114) including at least one valve element (122) having an outer diameter (162) and a metering face (164), said metering face (164) adapted to control the flow of pressurized fluid between said inlet (108) and said outlet (110) of said valve body (102), said metering face (164) including a flow force compensating annular void (166) disposed adjacent said outer diameter (162) and defined by a lead angle α measured between said outer diameter (162) and a line intersecting said outer diameter (162) and tangential to said annular void (166);
- said solenoid (104) adapted to move said valve member (114) to produce a flow area through said shift actuation valve (96) that is a function of the current delivered to said solenoid (104) to deliver a predetermined amount of pressurized fluid to at least one synchronizer (24) to selectively control the actuation of the synchronizer (24) to select a predetermined one of the plurality of gear sets in the transmission.

6. The automatic transmission (10) as set forth in claim 5 wherein said lead angle α falls within an angular range between 15 and 25 degrees.

7. The automatic transmission (10) as set forth in claim 5 wherein said solenoid (104) is operable to move said valve member (114) in one direction in said valve bore (104), said shift actuation valve (96) further including a biasing member (130) operable to generate a force on said valve member (114) acting in a direction opposite to the direction moved by said solenoid (104).

8. The automatic transmission (10) as set forth in claim 5 wherein said valve member (114) defines a reduced diameter portion (126) and said annular void (166) terminates in an annular flat disposed space from said reduced diameter portion (126).

* * * * *